US011494391B2

(12) United States Patent
Puthenputhussery et al.

(10) Patent No.: US 11,494,391 B2
(45) Date of Patent: Nov. 8, 2022

(54) METHODS AND APPARATUS FOR AUTOMATICALLY PROVIDING A RANKING OF ITEMS IN RESPONSE TO A SEARCH REQUEST

(71) Applicant: Walmart Apollo, LLC, Bentonville, AR (US)

(72) Inventors: Ajit Varghese Puthenputhussery, Sunnyvale, CA (US); Sachin Adlakha, Santa Clara, CA (US); Alessandro Magnani, Palo Alto, CA (US); Nikita Maple Sudan, Sunnyvale, CA (US); Sapeksha Virinchi Vemulapati, San Francisco, CA (US); Zhenrui Wang, Fremont, CA (US); Isha Ghai, Mountain View, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 435 days.

(21) Appl. No.: 16/777,465

(22) Filed: Jan. 30, 2020

(65) Prior Publication Data

US 2021/0240722 A1 Aug. 5, 2021

(51) Int. Cl.
*G06F 16/24* (2019.01)
*G06F 16/2457* (2019.01)
*G06F 16/9536* (2019.01)
*G06Q 30/06* (2012.01)
*G06Q 30/02* (2012.01)
*G06N 20/00* (2019.01)

(52) U.S. Cl.
CPC .... *G06F 16/24578* (2019.01); *G06F 16/9536* (2019.01); *G06N 20/00* (2019.01); *G06Q 30/0256* (2013.01); *G06Q 30/0631* (2013.01)

(58) Field of Classification Search
None
See application file for complete search history.

(56) References Cited

U.S. PATENT DOCUMENTS 8,972,391 B1 * 3/2015 McDonnell ....... G06F 16/24578
707/727
9,020,244 B2 * 4/2015 van Zwol .............. G06V 20/47
382/305

* cited by examiner

*Primary Examiner* — Belix M Ortiz Ditren
(74) *Attorney, Agent, or Firm* — Morgan, Lewis & Bockius LLP; Manita Rawat

(57) ABSTRACT

This application relates to apparatus and methods for ranking search results. In some examples, a computing device receives item data identifying items for a search query provided by a user. The computing determines, for each item, a first value based on a relevance of the item to the search query. The computing device also determines user engagement data for the user, where the user engagement data identifies engagements by the user on a webpage. The computing device determines, for each item, a second value based on the user engagement data. In some examples, the computing device determines the first values and second values by executing one or more machine learning models. The computing device further determines a ranking of the plurality of items based on the first values and the second values. The computing may transmit the ranking of the plurality of items, such as to a web server.

20 Claims, 10 Drawing Sheets

| Item | Click | ATC | Orders | Rank | $0.9^{rank}$ | Relevance Probability | Relevance-Aware Scaled Pow Rank Label ($0.9^{rank}$ * wt * relevance_probability_score) |
|---|---|---|---|---|---|---|---|
| 1 | 8 | 4 | 2 | 1 | 0.9 | 0.9 | 25.92 = (0.9 * $Wt_{order}$ * rel_prob) |
| 2 | 4 | 2 | 0 | 2 | 0.81 | 0.85 | 11.01 = (0.81 * $Wt_{atc}$ * rel_prob) |
| 3 | 2 | 0 | 0 | 3 | 0.72 | 0.6 | 3.45 = (0.72 * $Wt_{click}$ * rel_prob) |
| 4 | 2 | 0 | 0 | 3 | 0.72 | 0.9 | 5.18 = (0.72 * $Wt_{click}$ * rel_prob) |
| 5 | 0 | 0 | 0 | 4 | 0.63 | 0.6 | 1.51 = (0.63 * $Wt_{else}$ * rel_prob) |

FIG. 8

METHODS AND APPARATUS FOR AUTOMATICALLY PROVIDING A RANKING OF ITEMS IN RESPONSE TO A SEARCH REQUEST

TECHNICAL FIELD

The disclosure relates generally to providing search results and, more specifically, to implementing machine learning processes to automatically determine and provide a ranking of items in response to a search request.

BACKGROUND

At least some websites, such as retailer websites, allow a visitor to search for items. For example, the website may include a search bar that allows the visitor to enter search terms, such as one or more words, that the website uses to search for items. In response to the search terms, the website may display search results with items that meet the requirements of the search algorithm implemented by the website. For example, the search results may identify items that are offered for purchase by the retailer. These search results, however, can have drawbacks. For example, the search results may include items that are irrelevant to the person conducting the search query. In some cases, the search results may include items that do not correspond to the intent of the person conducting the search. As a result, the person conducting the search may need to spend time ignoring irrelevant search results before viewing relevant search results. In addition, although the website may return similar search results to different visitors entering the same search terms, not all visitors entering the same search term are searching for or interested in the same items. As a result, a website visitor conducting a search may need to peruse through many search result items before potentially locating an item they are interested in. As such, there are opportunities to address the determination of search results to a search query to website visitors.

SUMMARY

The embodiments described herein are directed to automatically determining and providing search results in response to a search request. The search request may be entered in a search bar of a website, and in response, the website may display the provided search results. In some examples, the embodiments employ one or more machine learning processes to determine the search results. The embodiments may allow a customer to be presented with search results that are more relevant to a customer conducting the search. In some examples, the embodiments display more relevant items before less relevant items. For example, the embodiments may allow for the ranking of search results, with more relevant items ranked ahead of less relevant items. The items may then be displayed in ranked order.

As a result, the embodiments may allow a retailer to present more relevant search results to each customer. The embodiments may also allow a retailer to present items the customer may be interested in earlier in a search result listing. As a result, customer experience with a website may be improved. For example, the customer may more quickly locate an item of interest, which may save the customer time as well as encourage the customer to purchase the item. In addition, because a customer may now spend less time searching for an item, the customer may have additional time to consider additional items for purchase. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device is configured to receive item data identifying a plurality of items for a search query provided by a user and determine, for each of the plurality of items, a first value based on a relevance of each of the plurality of items to the search query. In some examples, determining the first values comprises executing a first machine learning model, such as one based on gradient boosted trees. The computing device may also be configured to determine user engagement data for the user, where the user engagement data identifies engagements by the user on a webpage. The computing device may further be configured to determine, for each of the plurality of items, a second value based on the user engagement data. In some examples, determining the second values comprises executing a second machine learning model, such as one based on gradient boosted trees. The computing device may be configured to determine, based on the first values and the second values, a ranking of the plurality of items. The computing device may also be configured to transmit the ranking of the plurality of items. For example, the computing device may transmit the ranking of the plurality of items to a web server. The web server may then display the items on the webpage as search results to the search query according to the ranking.

In some embodiments, a method is provided that includes receiving item data identifying a plurality of items for a search query provided by a user, and determining, for each of the plurality of items, a first value based on a relevance of each of the plurality of items to the search query. In some examples, the method includes executing a first machine learning model, such as one based on gradient boosted trees, to determine the first values. The method may also include determining user engagement data for the user, wherein the user engagement data identifies engagements by the user on a webpage. Further, the method may include determining, for each of the plurality of items, a second value based on the user engagement data. In some examples, the method includes executing a second machine learning model, such as one based on gradient boosted trees, to determine the second values. The method may include determining, based on the first values and the second values, a ranking of the plurality of items. The method may also include transmitting the ranking of the plurality of items. For example, the method may include transmitting the ranking of the plurality of items to a web server. The web server may then display the items on the webpage as search results to the search query according to the ranking.

In yet other embodiments, a non-transitory computer readable medium has instructions stored thereon, where the instructions, when executed by at least one processor, cause a computing device to perform operations that include receiving item data identifying a plurality of items for a search query provided by a user, and determining, for each of the plurality of items, a first value based on a relevance of each of the plurality of items to the search query. In some examples, the operations include executing a first machine learning model, such as one based on gradient boosted trees, to determine the first values. The operations may also include determining user engagement data for the user, wherein the user engagement data identifies engagements by the user on a webpage. Further, the operations may include determining, for each of the plurality of items, a second value based on the user engagement data. In some examples, the operations include executing a second machine learning model, such as one based on gradient boosted trees, to determine the second values. The operations may include determining, based on the first values and the second values, a ranking of the plurality of items. The operations may also include transmitting the ranking of the plurality of items. For example, the operations may include transmitting the ranking of the plurality of items to a web server. The web server may then display the items on the webpage as search results to the search query according to the ranking.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 8 is a chart indicating relevance and rank based label data generated by the search result determination computing device of FIG. 2 in accordance with some embodiments;

DETAILED DESCRIPTION

Figure 1:
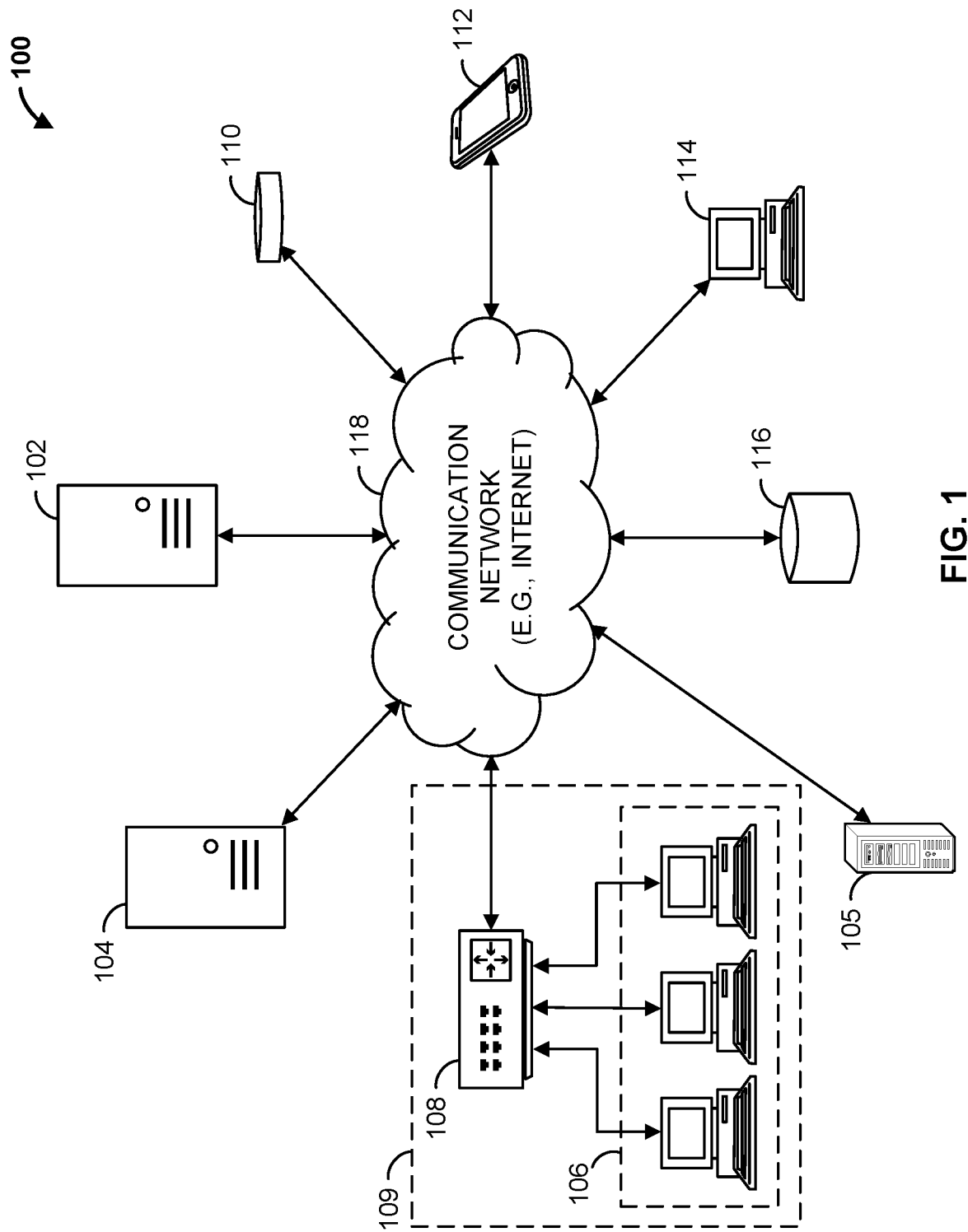
FIG. 1 is a block diagram of a search result determination system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a search result determination system 100 that includes a search result determination computing device 102 (e.g., a server, such as an application server), a web server 104, workstation(s) 106, database 116, an item recommendation system 105, and multiple customer computing devices 110, 112, 114 operatively coupled over network 118. Search result determination computing device 102, workstation(s) 106, server 104, item recommendation system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, search result determination computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, search result determination computing device 102 is operated by a retailer, and multiple customer computing devices 112, 114 are operated by customers of the retailer.

Although FIG. 1 illustrates three customer computing devices 110, 112, 114, search result determination system 100 can include any number of customer computing devices 110, 112, 114. Similarly, search result determination system 100 can include any number of workstation(s) 106, search result determination computing devices 102, web servers 104, item recommendation systems 105, and databases 116.

Workstation(s) 106 are operably coupled to communication network 118 via router (or switch) 108. Workstation(s) 106 and/or router 108 may be located at a store 109, for example. Workstation(s) 106 can communicate with search result determination computing device 102 over communication network 118. The workstation(s) 106 may send data to, and receive data from, search result determination computing device 102. For example, the workstation(s) 106 may transmit purchase data related to orders purchased by customers at store 109 to search result determination computing device 102. In some examples, search result determination computing device 102 may transmit, in response to received purchase data, an indication of one or more item advertisements to provide to a customer. For example, the item advertisements may be displayed on a receipt handed to the customer for the purchase order.

In some examples, web server 104 hosts one or more web pages, such as a retailer's website. Web server 104 may transmit purchase data related to orders purchased on the website by customers to search result determination computing device 102. Web server 104 may also transmit a search request to search result determination computing device 102. The search request may identify a search query provided by a customer. In response, to the search request, search result determination computing device 102 may transmit an indication of one or more item advertisements to display on the website to the purchasing customer. For example, the item advertisements may be displayed on a search results webpage in response to a search query entered by a customer.

First customer computing device 110, second customer computing device 112, and N$^{th}$ customer computing device 114 may communicate with web server 104 over communication network 118. For example, each of multiple computing devices 110, 112, 114 may be operable to view, access, and interact with a website hosted by web server 104. In some examples, web server 104 hosts a website for a retailer that allows for the purchase of items. The website may further allow a customer to search for items on the website via, for example, a search bar. A customer operating one of multiple computing devices 110, 112, 114 may access the website and perform a search for items on the website by entering in one or more terms into the search bar. In response, the website may return search results identifying one or more items. The website may allow the operator to add one or more of the items to an online shopping cart, and allow the customer to perform a "checkout" of the shopping cart to purchase the items.

Search result determination computing device 102 is operable to communicate with database 116 over communication network 118. For example, search result determination computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to search result determination computing device 102, in some examples, database 116 can be a local storage device, such as a hard drive, a non-volatile memory, or a USB stick. Search result determination computing device 102 may store purchase data received from store 109 and/or web server 104 in database 116. Search result determination computing device 102 may also store user session data identifying events associated with browsing sessions, such as when a customer browses a website hosted by web server 104. In some examples, database 116 stores one or more machine learning models that, when executed by search result determination computing device 102, allow search result determination computing device 102 to determine one or more search results in response to a search query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Search result determination computing device 102 may receive a search request for a website from web server 104. The search request may identify a search query provided by a customer (e.g., via a search bar on the website). In some examples, search result determination computing device 102 may determine an initial set of items based on the search query. In some examples, search result determination computing device 102 determines the initial set of items based on execution of an item recommendation model (e.g., algorithm). In some examples, the initial set of items are obtained from a database, such as database 116, or from a recommendation system, such as item recommendation system 105. Item recommendation system 105 may be a third-party server that provides item recommendations based on a relevancy of items to the search query. The initial set of items may, in some examples, be ranked.

Search result determination computing device 102 may then re-rank the item recommendations based on implementation of a crowd model, and an engagement model. Each of the crowd model and the engagement model may be machine learning models (e.g., algorithms), such as a machine learning model based on gradient boost (e.g., gradient boosted trees).

For example, the crowd model may receive the initial set of items and, for each item identified, generate a relevance probability value (e.g., score). The relevance probability value may indicate a relative relevancy of the item to the search query.

Search result determination computing device 102 may also generate a relevance and rank based label value for the item based on the corresponding relevance probability value, the rank of the item in the initial set of items, and engagement data for the item. Engagement data may include clicks of the item, views of the item, the item being added to an online shopping cart, or any other engagement of the item on a website, such as a website hosted by web server 104.

Search result determination computing device 102 may provide the relevance and rank based label value, along with the initial set of items, to the engagement model. The engagement model may generate an engagement probability value based on the relevance and rank based label value and the initial set of items. Search result determination computing device 102 may then re-rank the initial set of items based on the relevance probability values and the engagement probability values for each of the items.

Search result determination computing device 102 may transmit the re-ranked list of items to web server 104, and web server 104 may display the re-ranked list of items in ranked order on a website.

In some examples, the crowd model is trained with crowd data. The crowd model may be trained, for example, using a "listwise" or a "pairwise" approach. The crowd data may include a plurality of items associated with a search query, and, for each item, includes a value (e.g., score, rating) is assigned. The value associated with each item represents a relevance of the item to the corresponding search query. In some examples, the ratings are determined by humans (e.g., a crowd evaluation team). For example, search result determination computing device 102 may present (via user interface 205, as described below with respect to FIG. 2) a search query, and a list of (e.g., recommended) items associated with the search query. A person may decide, on a scale (e.g., 0-4), the rating each of each item based on how relevant they believe the item to be to the search query. The person may provide (e.g., via I/O device 203) the rating to search result determination computing device 102, and search result determination computing device 102 may store the crowd data in database 116.

In some examples, search result determination computing device 102 labels the items, corresponding to a particular search query, with the rating. In one example, the crowd data identifies items labelled using a relaxed labelling model, where the rating may be adjusted from what was originally provided (e.g., by a person). For example, assume an original rating scale of 0-4, where one or more persons provided the ratings of the items to a search query. If implementing a relaxed labelling model, search result determination computing device 102 may adjust original ratings of higher values (e.g., 4, 3) to one value (e.g., 1), and may adjust original ratings of lower values (e.g., 2, 1, 0) to another value (e.g., 0). In some examples, ratings of a highest value (e.g., 4) are adjusted to one value (e.g., 1), and all other ratings (e.g., 3, 2, 1, 0) are adjust to another value (e.g., 0). Although in these examples the ratings are adjusted to one of two values, in other examples, the ratings may be adjusted to any other number of values. Typically, the number of values that the ratings are readjusted to is less than the number of possible original rating values.

Once trained with crowed data, the crowd model can generate the relevance probability values, which as noted above may indicate a relative relevancy of an item to a search query (e.g., search term). The relevancy probability values may be generated within a range. For example, the range of relevancy probability values may include values from a first value, to a second value, inclusive. For example, a range of relevancy probability values may include 0 to 1, inclusive.

In some examples, the engagement model is trained with a plurality of items and engagement data corresponding to the plurality of items, as well as the generated relevance and rank based label data (e.g., generated relevance and rank based values). For example, a trained crowd model may be executed to generate relevance probability data for a plurality of items. To generate the relevance and rank based label data for each of the plurality of items, search result determination computing device 102 may employ (e.g., execute) a relevance and rank based labelling model (e.g., an algorithm). The relevance and rank based labelling model may be based on the rank of the item as ranked in the initial set of items, as well as on the relevance probability data for the item (e.g., as generated by the crowd model). For example, the relevance and rank based labelling model may be based on the equation below:

$$\text{relevance and rank based label value} = 0.9^{-rank} * wt * \text{relavance\_probability\_score}; \quad (\text{eq. 1})$$

where:
rank=the rank of the item in the initial set of items;
wt=a weighting (e.g., coefficient); and
relevance_probability_score=generated by the trained crowd model.

The value of wt may be based on engagement data for the item. For example, if there is order data available for the item, the value of wt (e.g., $wt_{order}$) may be a first value (e.g., 32). Otherwise, if there is no order data available for the item, but there is add-to-cart data available for the item, the value of wt (e.g., $wt_{atc}$) may be a second value (e.g., 16). If there is no order data or add-to-cart data available for the item, but there is click data (e.g., the item has been clicked on a website, such as a website hosted by web server 104), the value of wt (e.g., $wt_{click}$) may be a third value (e.g., 8). In all other cases, the value of wt (e.g., $wt_{else}$) may be a fourth value (e.g., 4).

FIG. 8 illustrates a chart 800 illustrating the computation of relevance and rank based label values 816 using equation 1 above for five items 802. The chart 800 illustrates, for each item 802, a number of clicks 804, a number of add-to-cart events 806, a number of orders 808, and an original rank 810. The original rank 810 for each item is an original ranking, e.g., one obtained from item recommendation system 105 for a given search query. The chart further includes a rank weighting column 812, which identifies a weighting for original rank 810 (which in this example includes a coefficient of 0.9, but in other examples, can include a different value for the coefficient), and a relevance probability column 814, which represents a relevance probability value (e.g., generated by a trained crowd model) for each of the items 802.

In this example, $wt_{order}$=32; $wt_{atc}$=16; $wt_{click}$=8; and $wt_{else}$=4. For example, for the first item, the relevance and rank based label value 816 is computed using $wt_{order}$ because there are two orders for the item (as identified in the column identifying the number of orders 808). The computation for the relevance and rank based label value 816 for the second item, however, uses $wt_{atc}$ because there are no orders for the second item, but the second item has been added to a cart (e.g., an online cart) two times. For the third and fourth items, The engagement model may then be trained with engagement data (e.g., as stored in database 116) for the plurality of items, as well as the labelled relevance data for the plurality of items. $wt_{click}$ is used to compute the corresponding relevance and rank based label values 816 because there are no orders and add-to-cart events, but each of the second item and third item have been clicked on (e.g., on a website hosted by web server 104). For the fifth item, there are no engagement events, and thus $wt_{else}$ is used to compute the corresponding relevance and rank based label value 816.

In some examples, the engagement data used to determine the wt values is per customer. In other words, the wt values used to determine relevance and rank based label values for an item for a customer is based on engagement data for that item by that customer. In some examples, the engagement data used to determine the wt values is aggregated based on a plurality of customers.

In some examples, engagement data for a particular category (e.g., clicks, add-to-cart events, orders, etc.) must meet a threshold before the wt value for that particular category is used. For example, the relevance and rank based labelling model may include a requirement that the number of clicks for an item must be at least a threshold number (e.g., 5) before the relevance and rank based labelling model will use $wt_{click}$ to determine the relevance and rank based label value for the item. Similarly, the relevance and rank based labelling model may include a requirement of a number of events for each category of engagement data. Each of the requirements may be the same, or different, number of events Referring back to FIG. 1, the relevance and rank based values, along with the plurality of items and engagement data corresponding to the plurality of items, are provided to the engagement model for training. The engagement model may be trained, for example, using a "listwise" or a "pairwise" approach. Once trained, the engagement model may then generate engagement probability values for one or more items.

Search result determination computing device 102 may employ the trained crowd model, the trained engagement model, and the relevance and rank based labelling model to re-rank an initial set of items. For example, search result determination computing device 102 may receive a search request identifying a search term provided by a customer on a website, such as on a website hosted by web server 104. Search result determination computing device 102 may determine an initial set of items (e.g., a set of relevant items), such as by sending a request to item recommendation system 105 and receiving the initial set of items in response. In some examples, search result determination computing device 102 generates the initial set of items based on, for example, an item relevancy model, which may be a machine learning model. Search result determination computing device 102 may then determine a ranking (e.g., a re-ranking) of the initial set of items based on the output of each of the crowd model and the engagement model.

In one example, search result determination computing device 102 employs a "stacked ranker" configuration where the initial set of items are divided into "tiers" based on their corresponding relevance probability values (as generated by the crowd model). Each tier may correspond to a range of possible relevance probability values. For example, a first tier may correspond to a first percentage (e.g., 25%) of the highest possible relevance probability values. Similarly, a second tier may correspond to a second percentage (e.g., 25%) of the next highest possible relevance probability values, a third tier may correspond to a third percentage (e.g., 25%) of yet the next highest possible relevance probability values, and a fourth tier may correspond to a fourth percentage (e.g., 25%) of the lowest possible relevance probability values. As another example, and assuming a range of relevancy probability values between 0 and 1, inclusive, example tier thresholds may include a first tier for items with relevancy probability values of 0.8 and higher, a second tier for items with relevance probability values of 0.6 and higher up to but not including 0.8, a third tier for items with relevancy probability values of 0.4 and higher up to but not including 0.6, and a fourth tier for items with relevancy probability values of 0.2 and higher up to but not including 0.4. Finally, there may be a fifth tier for items with relevancy probability values of less than 0.2.

Although these examples illustrates five tiers, any number of tiers may be employed. For example, four tiers may be employed. As an example, and assuming a range of relevancy probability values between 0 and 1, inclusive, a first tier may include items with relevance probability values of 0.7 and higher, a second tier may include items with relevance probability values 0.4 and higher up to, but not including 0.7, a third tier may include items with relevance probability values items with relevance probability values 0.1 and higher up to, but not including 0.4, and a fourth tier may include items with relevance probability values of less than 0.1. In addition, the range of probability values illustrated in these examples is merely exemplary, and may differ in other examples (e.g., a range of relevancy probability values of 0 to 100).

Items within a tier that is associated with a higher relevance value range are ranked ahead of items in a different tier that is associated with a lower relevance value range.

To determine a final ranking of the items, within each tier, search result determination computing device 102 ranks the items based on their corresponding engagement probability value (as generated by the engagement model).

In another example, search result determination computing device 102 employs a "linear combination" of the crowd model and the engagement model to determine the re-ranking of items. In this example, the re-ranking of the items is based on applying weights (e.g., coefficients) to the relevance probability value (e.g., relevance probability score) and engagement probability value (e.g., engagement probability score) for each item. For example, search result determination computing device 102 may determine final ranking values for the items based on the equation below.

final_item_score=
($wt_{crowd}$*relavance_probability_score)+
($wt_{engage}$*engage_probability_score); (eq.2)

where:
$wt_{crowd}$=weight applied to the relevance probability score;
$wt_{engage}$=weight applied to the engagement probability score;
relevance_probability_score=generated by the trained crowd model; and
engage_probability_score=generated by the trained engagement model.

In some examples, $wt_{crowd}$=0.75 and $wt_{engage}$=0.25. In some examples, $wt_{crowd}$=0.14 and $wt_{engage}$=0.86. In some examples, $wt_{crowd}$=0.24 and $wt_{engage}$=0.76. In some examples, $wt_{crowd}$=0.50 and $wt_{engage}$=0.50. In some examples, $wt_{crowd}$=0.20 and $wt_{engage}$=0.80. In some examples, $wt_{crowd}$=0.35 and $wt_{engage}$=0.65. Any other combination of these weights are also contemplated. In some examples, the weights may be determined based on one or more machine learning processes that operate on the relevance probability values and engagement probability values generated by the crowd model and the engagement model, respectively.

In yet another example, search result determination computing device 102 employs a "non-linear combination" of the crowd model and the engagement model to determine the re-ranking of items. In this example, the re-ranking of the items is also based on applying weights (e.g., coefficients) to the relevance probability value (e.g., relevance probability score) and engagement probability value (e.g., engagement probability score) for each item, but introduces one or more non-linear relationships between the relevance probability value and the engagement probability value. For example, search result determination computing device 102 may determine final ranking values for the items based on the equation below, final_item_score=
($wt_{crowd}$*relavance_probability_score)+
($wt_{engage}$*engage_probability_score)+
($wt_{product}$*relavance_probability_score*engage_probability_score); (eq.3)

where:
$wt_{crowd}$=weight applied to the relevance probability score;
$wt_{engage}$=weight applied to the engagement probability score;
$t_{product}$=weight applied to the product of relevance probability score and the engagement probability score;
relevance_probability_score=generated by the trained crowd model; and
engage_probability_score=generated by the trained engagement model.

In some examples, $wt_{crowd}$=0.33, $wt_{engage}$=0.33, and $wt_{product}$=0.34. In some examples, $wt_{crowd}$=0.25, $wt_{engage}$=0.50, and $wt_{product}$=0.25. In some examples, $wt_{crowd}$=0.35, $wt_{engage}$=0.65, and $wt_{product}$=1.0. Any other combination of these weights are also contemplated. In some examples, the weights may be determined based on one or more machine learning processes that operate on the relevance probability values and engagement probability values generated by the crowd model and the engagement model, respectively Once the items are re-ranked, the re-ranked items may be transmitted to web server 104. Web server 104 may display the items on a search results page of a website in response to a search query by a customer.

Figure 2:
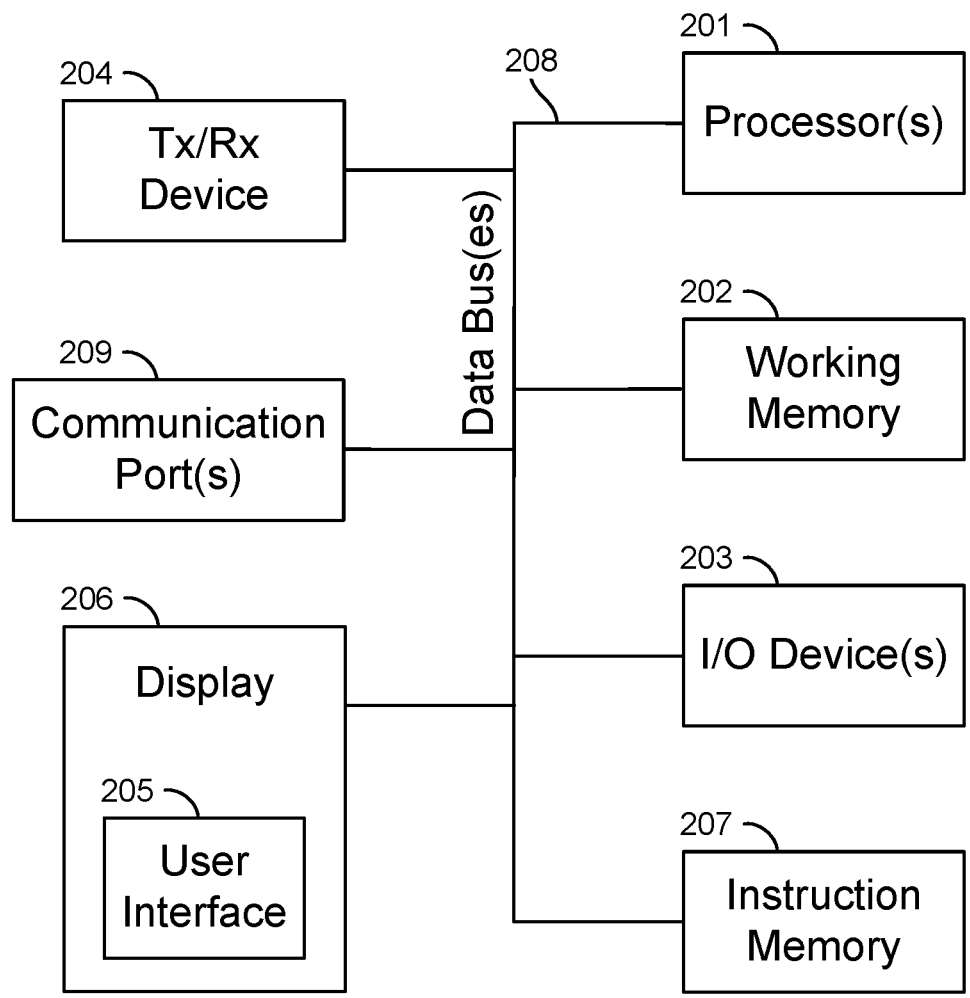
FIG. 2 is a block diagram of the search result determination computing device of the search result determination system of FIG. 1 in accordance with some embodiments.

FIG. 2 illustrates the search result determination computing device 102 of FIG. 1. Search result determination computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of search result determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with search result determination computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 search result determination computing device 102 will be operating in. Processor(s) 201 is operable to receive data from, or send data to, a network, such as communication network 118 of FIG. 1, via transceiver 204.

Figure 3:
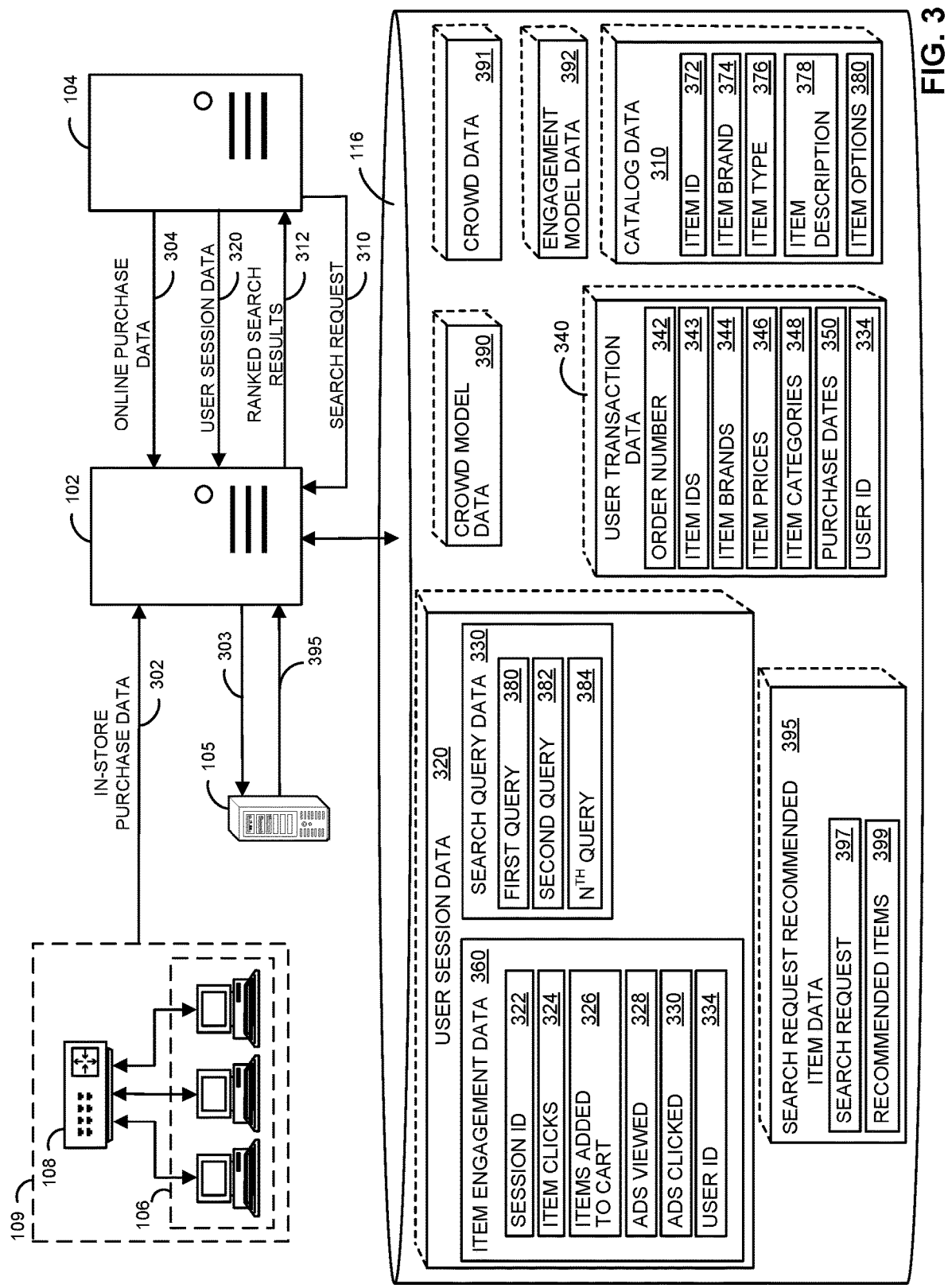
FIG. 3 is a block diagram illustrating examples of various portions of the search result determination system of FIG. 1 in accordance with some embodiments.

FIG. 3 is a block diagram illustrating examples of various portions of the search result determination system 100 of FIG. 1. As indicated in the figure, search result determination computing device 102 may receive user session data 320 from web server 104, and store user session data 320 in database 116. User session data 320 identifies, for each user, data related to a browsing session, such as when browsing a retailer's webpage hosted by web server 104. In this example, user session data 320 includes item engagement data 360 and search query data 330. Item engagement data 360 includes a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, and user ID 334 ID (e.g., a customer ID, retailer website login ID, etc.). Search query data 330 identifies one or more searches conducted by a user during a browsing session (e.g., a current browsing session). In this example, search query data 330 includes first query 380, second query 382, and $N^{th}$ query 384.

Search result determination computing device 102 may also receive in-store purchase data 302 identifying and characterizing one or more purchases from one or more stores 109. Similarly, search result determination computing device 102 may receive online purchase data 304 from web server 104, which identifies and characterizes one or more online purchases, such as from a retailer's website. Search result determination computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and user ID 334 for the user making the corresponding purchase.

Database 116 may further store catalog data 310, which may identify one or more attributes of a plurality of items, such as a portion of or all items a retailer carries. Catalog data 310 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

In some examples, search result determination computing device 102 may receive a search request 310 identifying and characterizing a search query for a user. The search query may include data identifying and characterizing one or more words, for example. Search result determination computing device 102 may determine an initial set of recommended items for the search query. The initial set of recommended items may be items recommended to be displayed to the user in response to the search request 310. In some examples, search result determination computing device 102 determines the initial set of recommended items based on search request recommended item data 395 stored in database 116. Search request recommended item data 395 may identify recommended items 399 for each of a plurality of search requests 397, and may identify an initial ranking of the recommended items 399.

In some examples, search result determination computing device 102 transmits an item recommendation request 303 to item recommendation system 105. In response, item recommendation system 105 may determine the initial set of recommended items, and transmit search request recommended item data 395 identifying the initial set of recommended items (e.g., recommended items 399) to search result determination computing device 102.

Search result determination computing device 102 may then rank (e.g., re-rank) the initial set of recommended items based on a trained crowd model and a trained engagement model. For example, search result determination computing device 102 may obtain crowd model data 390 and engagement model data 392 from database 116. Crowd model data 390 may identify and characterize a crowd model, such as one based on gradient boosted trees. Search result determination computing device may execute crowd model data 390 to generate a relevance probability value for each of the initial set of recommended items.

Search result determination computing device 102 may also generate a relevance and rank based label value for each of the initial set of recommended items based on the corresponding relevance probability value for each item, the initial rank of each of the initial set of recommended items, and item engagement data 360 associated with each item. For example, search result determination computing device 102 may generate the relevance and rank based label values (e.g., relevance and rank based label values 816) based on equation 1 described above.

Engagement model data 392 may identify and characterize an engagement model, such as one based on gradient boosted trees. Search result determination computing device 102 may execute engagement model data 392 to generate an engagement probability value for each of the initial set of recommended items based on the relevance and rank based label value for each of the initial set of recommended items.

Search result determination computing device 102 may then re-rank the initial set of recommended items based on the relevance probability values and the engagement probability values for each of the initial set of recommended items. Search result determination computing device 102 transmits ranked search results 312 to web server 104, where ranked search results 312 identifies the re-ranked set of recommended items.

For example, search result determination computing device 102 may determine the re-ranking of the initial set of recommended items based on a "stacked ranker" configuration of the crowd model and the engagement model. As another example, search result determination computing device 102 employs a "linear combination" of the crowd model and the engagement model to determine the re-ranking of the initial set of recommended items. For example, search result determination computing device 102 may determine final ranking values for the initial set of recommended items based on the equation 2 described above. As yet another example, search result determination computing device 102 employs a "non-linear combination" of the crowd model and the engagement model to determine the re-ranking of the initial set of recommended items. For example, search result determination computing device 102 may determine final ranking values for the initial set of recommended items based on the equation 3 described above.

In some examples, search request 310 identifies which of the "stacked ranker" configuration, the "linear combination," and the "non-linear combination" of the crowd model and the engagement model search result determination computing device 102 should employ to determine the re-ranking of the initial set of recommended items. In some examples, a setting (e.g., as selected by a customer) determines which configuration search result determination computing device 102 should employ.

Figure 4:
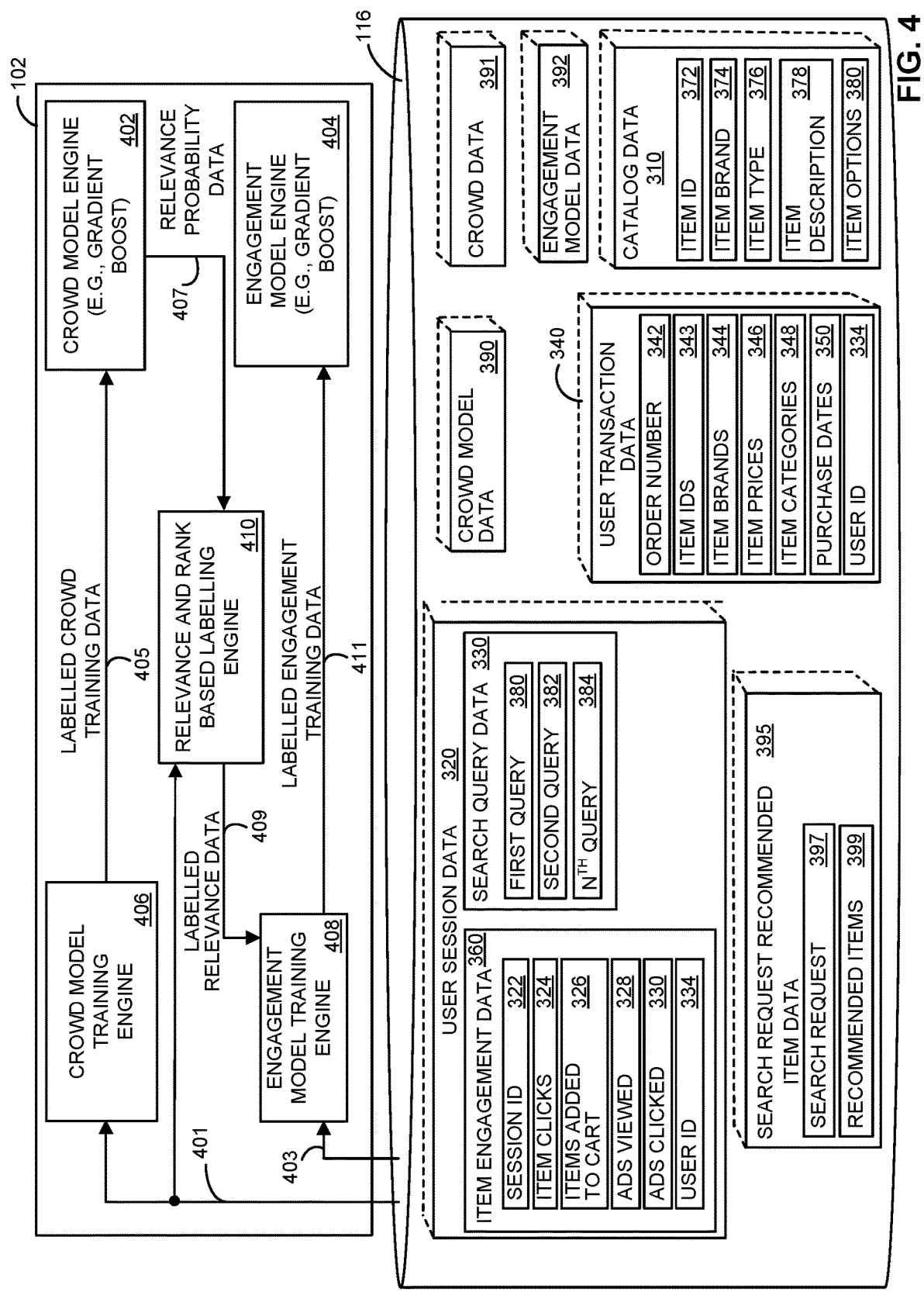
FIG. 4 is a block diagram illustrating examples of various portions of the search result determination computing device of FIG. 1 in accordance with some embodiments.

FIG. 4 illustrates further exemplary portions of the search result determination computing device 102 of FIG. 1. Specifically, FIG. 4 illustrates the training of a crowd model (e.g., as identified by crowd model data 390) and an engagement model (e.g., as identified by engagement model data 392). As indicated in FIG. 4, search result determination computing device 102 includes crowd model training engine 406, engagement model training engine 408, crowd model engine 402, engagement mode engine 404, and relevance and rank based labelling engine 410. In some examples, one or more of crowd model training engine 406, engagement model training engine 408, crowd model engine 402, engagement mode engine 404, and relevance and rank based labelling engine 410 may be implemented in hardware. In some examples, one or more of crowd model training engine 406, engagement model training engine 408, crowd model engine 402, engagement mode engine 404, and relevance and rank based labelling engine 410 may be implemented as an executable program maintained in a tangible, non-transitory memory, such as instruction memory 207 of FIG. 2, that may be executed by one or processors, such as processor 201 of FIG. 2.

In this example, crowd model engine 402 is configured to execute a crowd model, such as one identified by crowd model data 390. Crowd model training engine 406 is configured to train the crowd model executed by crowd model engine 402. For example, crowd model training engine 406 may obtain crowd data 391 from database 116 to train the crowd model. In some examples, crowd model training engine 406 trains the crowd model with items identified in user transaction data 340 that have been rated. For example, crowd data 391 includes, for each of a plurality of items, corresponding user transaction data 340 (e.g., order numbers 342 that include an item ID 343 for each item) and, in some examples, corresponding catalog data 340. Crowd model training engine 406 may label the items to each corresponding search query with the rating identified in crowd data 391 (e.g., identifying each item), and may generate labelled crowd training data 405 identifying the labelled data. Crowd model training engine 406 may then provide labelled crowd training data 405 to crowed model engine 402 to train the crowd model.

Once trained, crowd model engine 402 may be configured to generate relevance probability data 407 identifying a relevance probability value for each item. Crowd model engine 402 may provide relevance probability data 407 to relevance and rank based labelling engine 410, which generates labelled relevance data 409 identifying a relevance and rank based label value (e.g., a relevance and rank based label value 816) for each item. For example, relevance and rank based labelling engine 410 may generate relevance and rank based label values based on equation 1 described above. Relevance and rank based labelling engine 410 may provide labelled relevance data 409, identifying the relevance and rank based label values, to engagement model training engine 408.

Engagement model engine 404 is configured to execute an engagement model, such as one identified by engagement model data 392. Engagement model training engine 408 is configured to train the engagement model executed by engagement model engine 404. For example, engagement model training engine 408 may obtain data, such as user session data 320, and may label the data (e.g., identifying each item). Engagement model training engine 408 may package the labelled data, along with the labelled relevance data 409 from relevance and rank based labelling engine 410, to generate labelled engagement training data 411. Engagement model training engine 408 may provide labelled engine training data 411 to engagement model engine 404 to train the engagement model.

Figure 5:
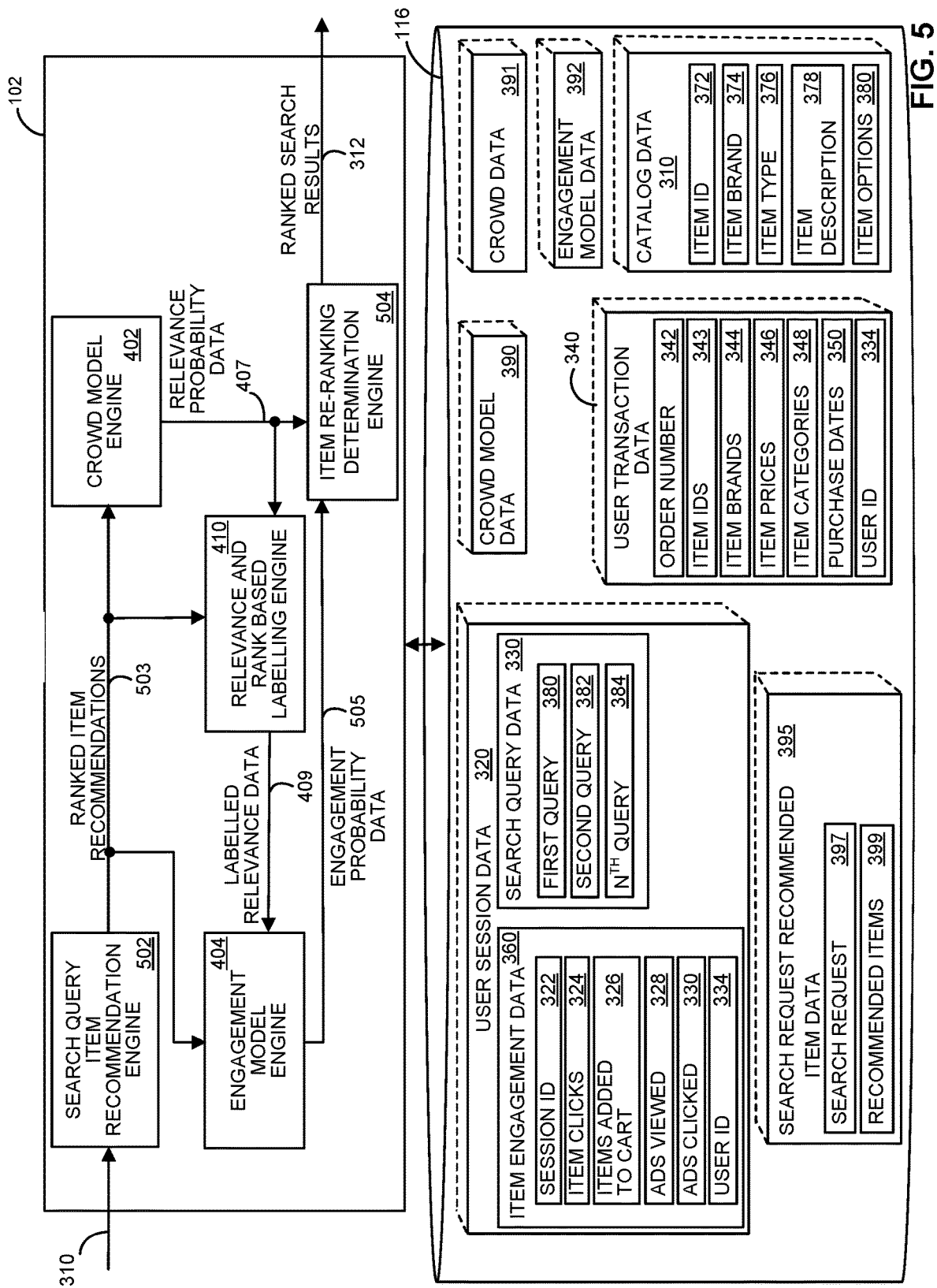
FIG. 5 is a block diagram illustrating examples of various portions of the search result determination computing device of FIG. 1 in accordance with some embodiments.

FIG. 5 illustrates further exemplary portions of the search result determination computing device 102 of FIG. 1. In this example, in addition to crowd model engine 402, engagement model engine 404, and relevance and rank based labelling engine 410, search result determination computing device 102 further includes search query item recommendation engine 402 and item re-ranking determination engine 504. Each of includes search query item recommendation engine 402 and item re-ranking determination engine 504 may also be implemented in hardware or, in some examples, implemented as an executable program maintained in a tangible, non-transitory memory, such as instruction memory 207 of FIG. 2, that may be executed by one or processors, such as processor 201 of FIG. 2.

Search query item recommendation engine 502 is configured to receive search request 310, such as from web server 104, and generate an initial set of ranked item recommendations 503. For example, search query item recommendation engine 502 may obtain, for a give query identified by search request 310, recommended items 399 from search request recommended item data 395 stored in database 116. In some examples, search query item recommendation engine 502 cause the transmission of an item recommendation request 303 to item recommendation system 105 and, in response, receive search request recommended item data 395 identifying the recommended items 399 for the query. Search query item recommendation engine 502 may then generate the initial set of ranked item recommendations 503 based on the recommended items 399. Search query item recommendation engine 502 provides the ranked item recommendations 503 to crowd model engine 402, to relevance and rank based labelling engine 410, and to engagement model engine 404.

Based on execution of a trained crowd model, crowd model engine 502 generates relevance probability data 407 identifying a relevance probability value for each of the ranked item recommendations 503. Crowd model engine 502 provides the relevance probability data 407 to relevance and rank based labelling engine 410 and to item re-ranking determination engine 504.

Relevance and rank based labelling engine 410 generates labelled relevance data 409 identifying a relevance and rank based label value for each of the ranked item recommendations 503. For example, relevance and rank based labelling engine 410 may determine the relevance and rank based label value for each of the ranked item recommendations 503 based on an initial rank of each item, and the relevance and rank based label value, for each item (e.g., such as by executing an algorithm based on equation 1 described above). Relevance and rank based labelling engine 410 may provide the labelled relevance data 409 to engagement model engine 404.

Based on execution of a trained engagement model, engagement model engine 404 generates engagement probability data 505 identifying an engagement probability value for each of the ranked item recommendations 503. Engagement model engine 404 provides the engagement probability data 505 to item re-ranking determination engine 504.

Item re-ranking determination engine 504 generates ranked search results 312 identifying a re-ranking of the ranked item recommendations 503. Item re-ranking determination engine 504 may re-rank the ranked item recommendations 503 based on relevance probability data 407 and engagement probability data 505. For example, item re-ranking determination engine 504 may generate the ranked search results 312 based on a "stacked ranker" configuration, a "linear combination," or a "non-linear combination" of the relevance probability data 407 and the engagement probability data 505. Item re-ranking determination engine 504 may transmit the ranked search results 312 to web server 104 in response to search request 310. Web server 104 may display the re-ranked items identified by the ranked search results 312 on a webpage in response to a search query entered by a user.

Figure 9A:
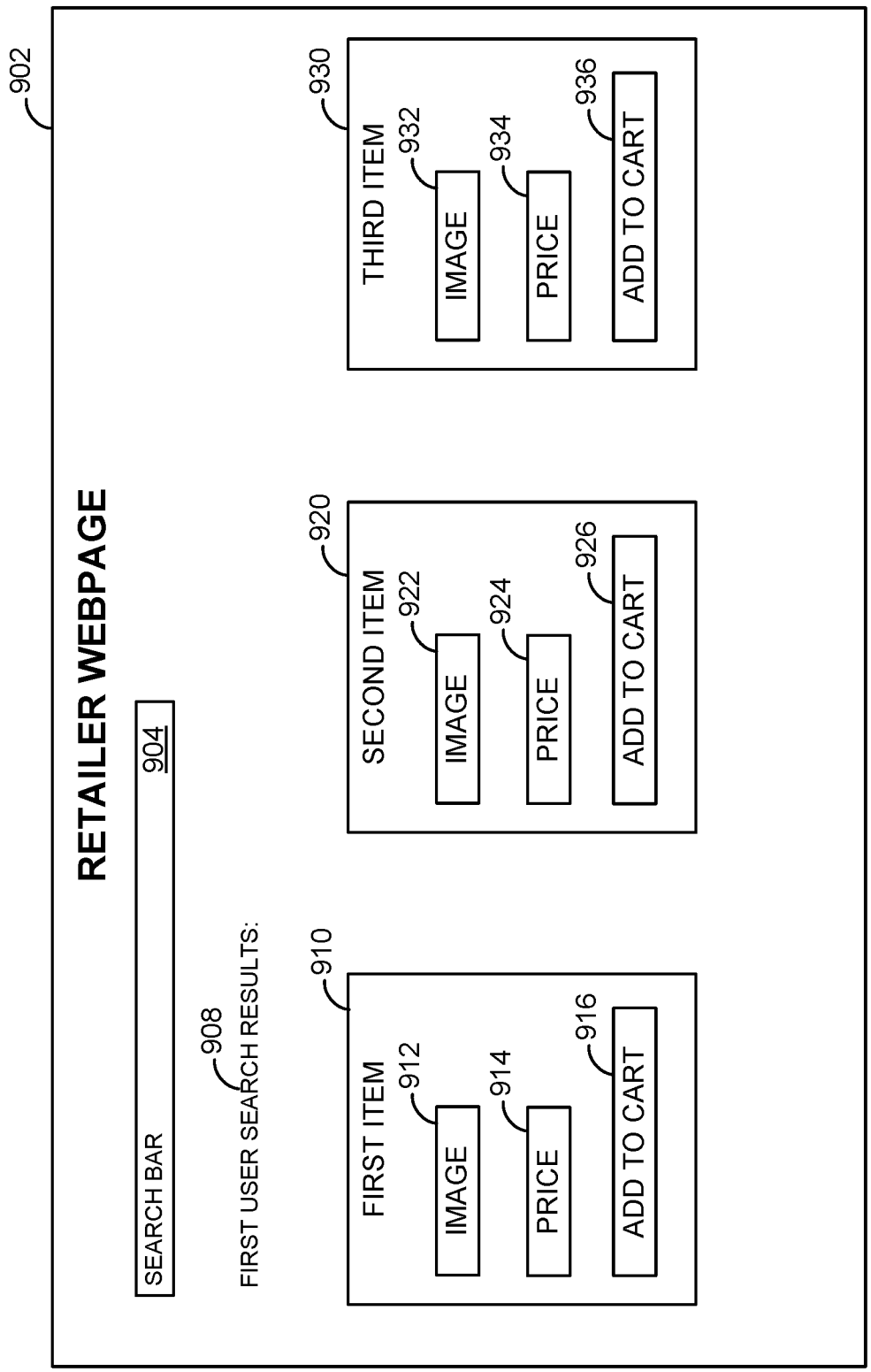
FIG. 9A is an example webpage displaying search results for a first user in accordance with some embodiments.
Figure 9B:
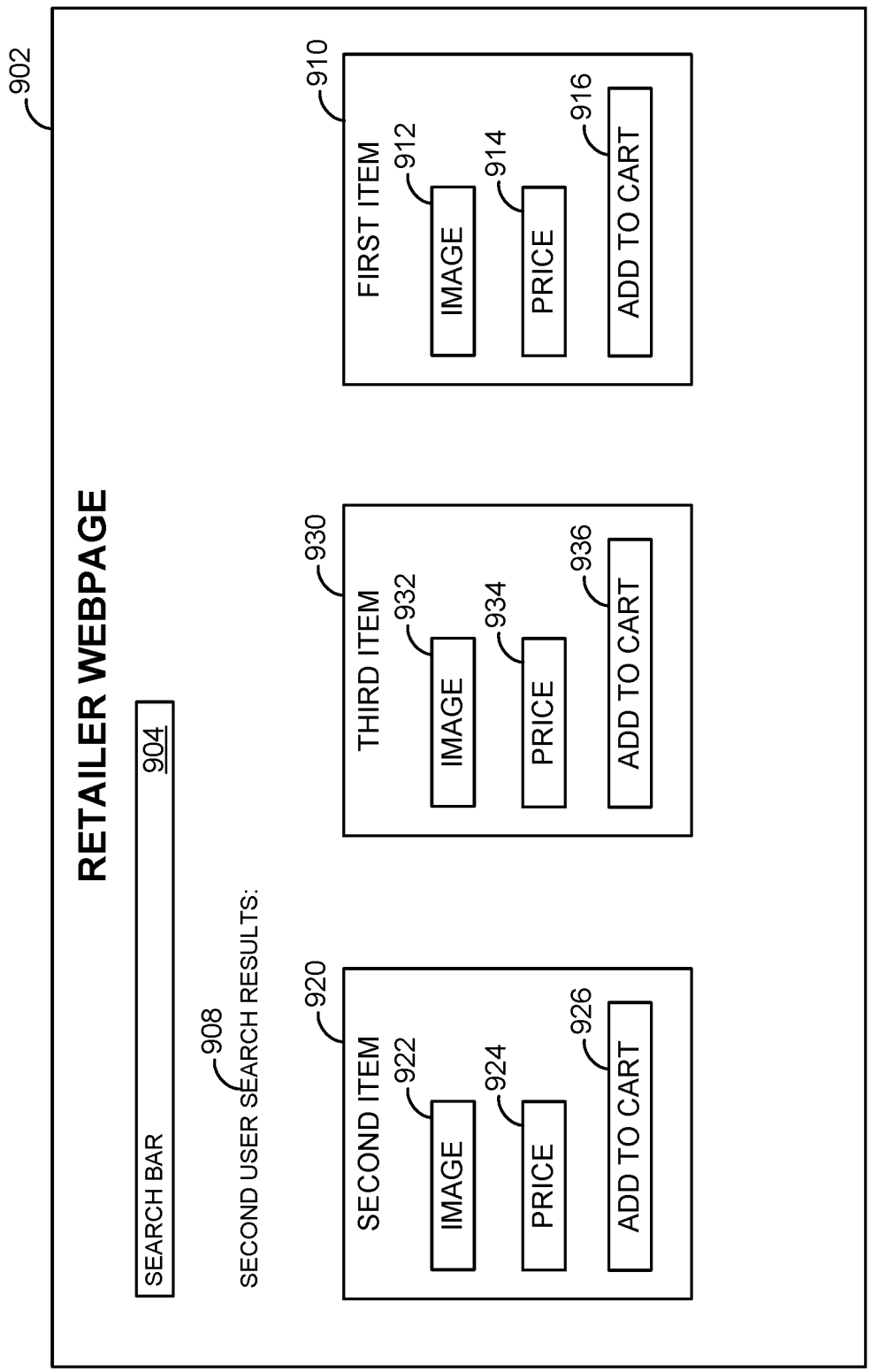
FIG. 9B is an example webpage displaying search results for a second user in accordance with some embodiments.

FIGS. 9A and 9B illustrate example webpages 902 displaying re-ranked search results for a first user and a second user, respectively. For example, and with reference to FIG. 9A, a first user operating one of multiple customer computing devices 110, 112, 114 may access a website hosted by web server 104. The first user may execute a search on the website, for example, via search bar 904. In response, web server 104 may transmit a search request 310 to search result determination computing device 102. Search result determination computing device 102 may execute a trained crowd model (e.g., as identified by crowd model data 390), and a trained engagement model (e.g., as identified by engagement model data 392), to generate ranked search results 312 identifying and characterizing the ranked list of search results for the first user. Search result determination computing device 102 may then transmit the ranked search results 312 to web server 104 to display the identified search results, in accordance with the rankings, to the first user.

In this example, FIG. 9A illustrates first user search results 908 that includes, in order, a first item 910, a second item 920, and a third item 930. Each item includes an image, a price, and an add-to-cart icon that allows for the first user to add the item for purchase to an online shopping cart associated with web page 902. In this example, first item 910 includes image 912, price 914, and add to cart icon 916. Similarly, second item 920 includes image 922, price 924, and add to cart icon 926, and third item 930 includes image 932, price 934, and add to cart icon 936.

FIG. 9B, however, illustrates second user search results 958 for a second user entering in a same or similar search request via search bar 904. In this example, because user session data 320 for the second user differs from user session data 320 for the first user, the search results are ranked differently. For example, relevance and rank based labelling engine 410 may provide differing labelled relevance data 409 for the first user and the second user when engagement data (e.g., as identified by user session data 320) for the first user satisfies one or more thresholds as described above, but engagement data for the second user does not satisfy one or more of the thresholds. As another example, labelled engagement training data 411 provided by engagement model training engine 408 may differ for the first user and the second user based on differing user session data 320 for the same items for each of the users. In this example, second user search results 958 identify, in order, second item 920, third item 930, and first item 910.

Figure 6:
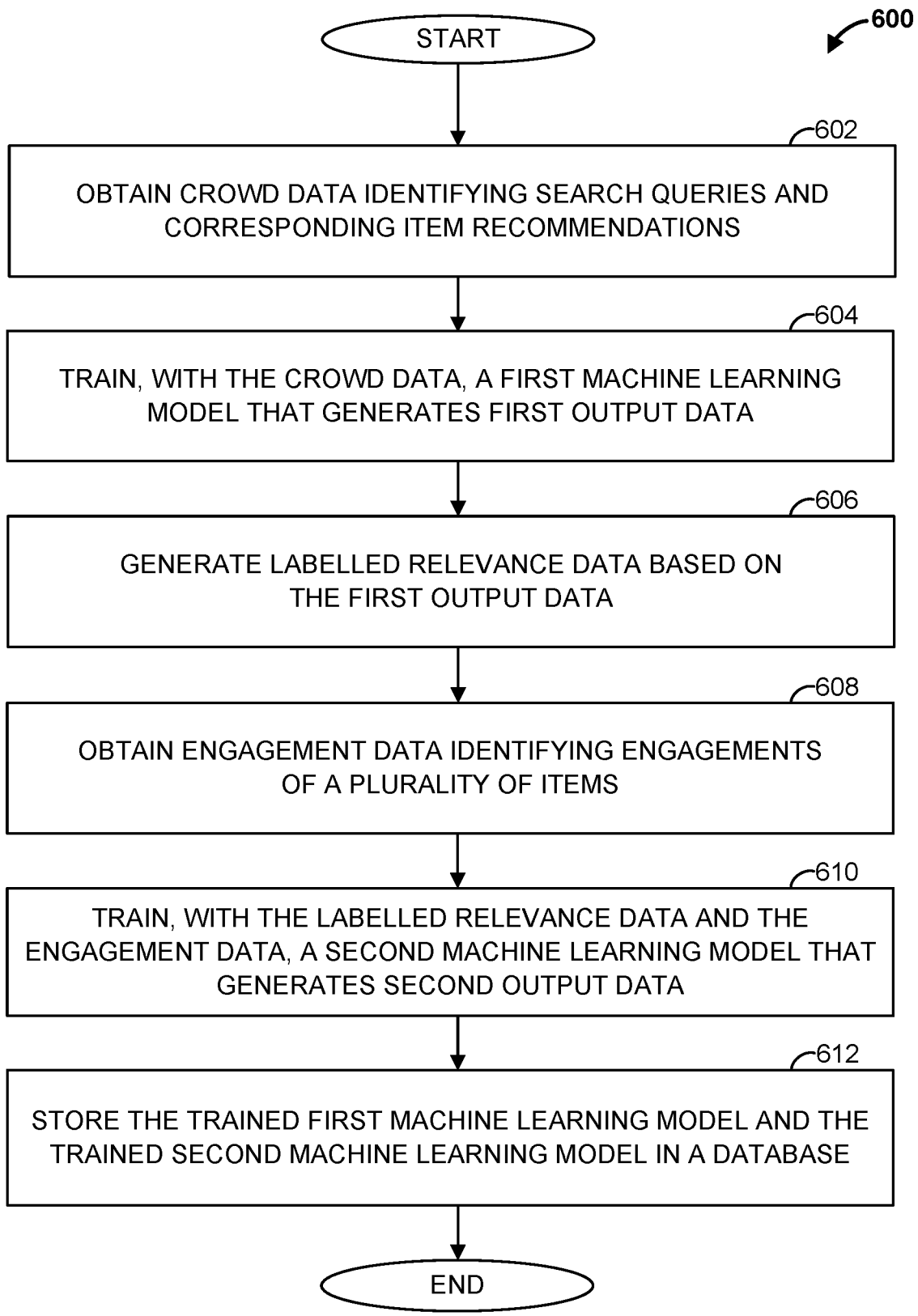
FIG. 6 is a flowchart of an example method that can be carried out by the search result determination system of FIG. 1 in accordance with some embodiments.

FIG. 6 is a flowchart of an example method 600 that can be carried out by the search result determination system 100 of FIG. 1. Beginning at step 602, a computing device, such as search result determination computing device 102, obtains crowd data identifying search queries and corresponding item recommendations. At step 604, a first machine learning model is trained with the crowd data. The first machine learning model generates first output data. For example, the first machine learning model may be a crowd model that generates relevance probability data 407.

Proceeding to step 606, labelled relevance data is generated based on the first output data. For example, relevance and rank based labelling engine 410 may generate labelled relevance data 409 based on executing an algorithm, such as one based on equation one, that operates on relevance probability data 407. At step 608, engagement data is obtained. The engagement data identifies engagements of a plurality of items. At step 610, a second machine learning model is trained with the labelled relevance data and the engagement data. The second machine learning model generates second output data. For example, the second machine learning model may be an engagement model that generates engagement probability data 505.

At step 612, the trained first machine learning model and the trained second machine learning model is stored in a database (e.g., disks, such as hard disks). For example, search result determination computing device 102 may store the trained first machine learning model and the trained second machine learning model as crowd model data 390, and engagement model data 392, respectively, in database 116. The method then ends.

Figure 7:
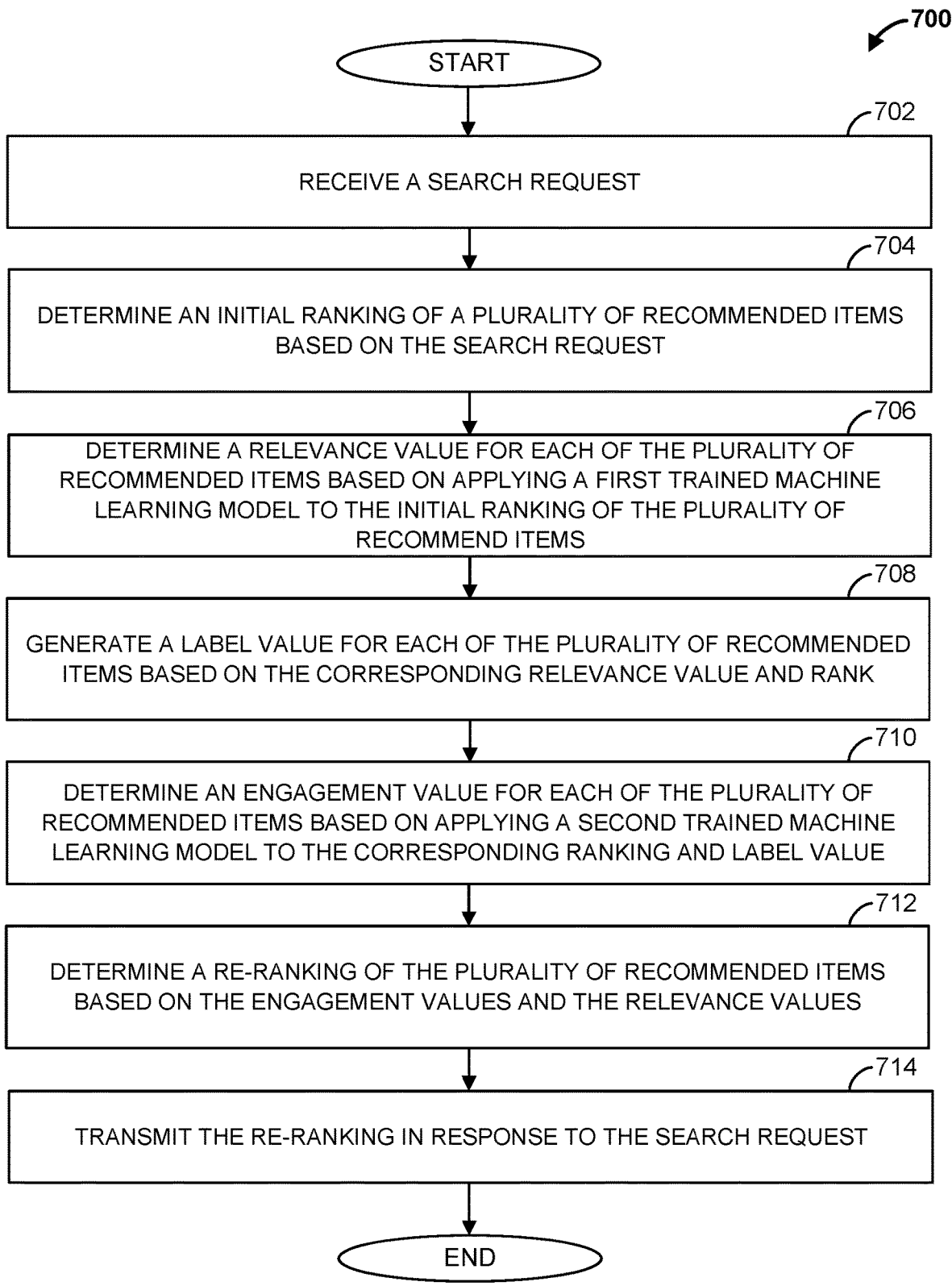
FIG. 7 is a flowchart of another example method that can be carried out by the search result determination system of FIG. 1 in accordance with some embodiments.

FIG. 7 is a flowchart of an example method 700 that can be carried out by the search result determination system 100 of FIG. 1. At step 702, a computing device, such as search result determination computing device 102, receives a search request, such as search request 310, from a computing device, such as web server 104. At step 704, an initial ranking of a plurality of recommended items is determined based on the search request. For example, search result determination computing device 102 may request and receive the initial ranking of the plurality of recommended items from item recommendation system 105. In some examples, search result determination computing device 102 may determine the initial ranking of the plurality of recommended items based on item recommendations stored in a database, such as search request recommended item data 395 stored in database 116.

Proceeding to step 706, a relevance value for each of the plurality of recommended items is determined based on applying a first trained machine learning model to the initial ranking of the plurality of recommended items. The first trained machine learning model may be a trained crowd model. For example, search result determination computing device 102 may apply a trained crowd model, such as one identified by crowd model data 390, to the initial ranking of the plurality of recommended items to generate the relevance values.

At step 708, a label value is generated for each of the plurality of recommended items based on the corresponding relevance value and rank. For example, search result determination computing device 102 may implement equation 1 to generate relevance and rank based label values.

At step 710, an engagement value is determined for each of the plurality of recommended items based on applying a second trained machine learning model to the corresponding ranking and label value. The second trained machine learning model may be a trained engagement model. For example, search result determination computing device 102 may apply a trained engagement model, such as one identified by engagement model data 392, to the initial ranking of the plurality of recommended items and the label values to generate the engagement values.

Proceeding to step 712, a re-ranking of the plurality of recommended items is determined based on the engagement values and the relevance values. For example, search result determination computing device 102 may generate ranked search results 312 based on a "stacked ranker" configuration, a "linear combination," or a "non-linear combination" of relevance probability data 407 identifying relevance values and engagement probability data 505 identifying engagement values. At step 714, the re-ranking of the plurality of recommended items is transmitted in response to the search request. For example, search result determination computing device 102 may transmit the ranked search results 312 to web server 104 in response to search request 310. Web server 104 may then display items identified by the ranked search results 312 on a webpage in an order according to the ranking. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
a computing device comprising at least one processor, the
at least one processor configured to:

receive item data identifying a plurality of items for a search query provided by a user;

determine, for each of the plurality of items, a first value based on a relevance of each of the plurality of items to the search query;

determine user engagement data for the user, wherein the user engagement data identifies engagements by the user for each of the plurality of items on a webpage, wherein the user engagement data identifies at least a first engagement type, a second engagement type, and a third engagement type;

determine, for each of the plurality of items, a weight value based on the user engagement data for each of the plurality of items, wherein:
- the weight value is a first weight value when the first engagement type is above a first threshold;
- the weight value is a second weight value when the first engagement type is not above the first threshold and the second engagement type is above a second threshold;
- the weight value is a third weight value when the second engagement type is not above the second threshold and the third engagement type is above a third threshold; and
- the weight value is a fourth weight value when the third engagement type is not above the third threshold;

determine, for each of the plurality of items, a second value based on the user engagement data and the weight values;

determine, based on the first values and the second values, a ranking of the plurality of items; and transmit the ranking of the plurality of items.

2. The system of claim 1, wherein the item data identifies an initial ranking of the plurality of items, and wherein the at least one processor is configured to:
determine, for each of the plurality of items, a third value based on the initial ranking of the plurality of items and the user engagement data corresponding to each of the plurality of items, wherein determining the second value for each of the plurality of items is based on the third value.

3. The system of claim 2, wherein the third value for each of the plurality of items is determined based on the corresponding weight value.

4. The system of claim 3, wherein the first engagement type comprises a number of clicks, the second engagement type comprises a number of add-to-cart events, and the third engagement type comprises a number of orders, wherein determining the weight value comprises:
determining the weight value is the first weight value when the number of clicks is above a first threshold;
determining the weight value is the second weight value when the number of clicks is not above the first threshold and the number of add-to-cart events is above a second threshold;
determining the weight value is the third weight value when the number of add-to-cart events is not above the second threshold and the number of orders is above a third threshold; and
determining the weight value is the fourth weight value when the number of orders is not above the third threshold.

5. The system of claim 1, wherein the first weight value is greater than the second weight value, the second weigh value is greater than the third weight value, and the third weight value is greater than the fourth weight value.

6. The system of claim 1, wherein determining, for each of the plurality of items, a first value based on the relevance of each of the plurality of items to the search query comprises applying a machine learning model based on gradient boosted trees to the first values.

7. The system of claim 6, wherein the at least one processor is configured to train the machine learning model with crowd model data.

8. The system of claim 1, wherein determining, for each of the plurality of items, the second value based on the user engagement data and the weight values comprises applying a machine learning model based on gradient boosted trees to the second values and the weight values.

9. The system of claim 8, wherein the at least one processor is configured to train the machine learning model with historical engagement data identifying previous engagements by a plurality of users on the webpage.

10. The system of claim 1, wherein the at least one processor is configured to:
receive the search query from a web server;
request the item data identifying the plurality of items from an item recommendation system; and
receive the item data from the item recommendation system.

11. The system of claim 1, wherein transmitting the ranking of the plurality of items comprises transmitting the ranking of the plurality of items to a web server, wherein the web server is configured to display item advertisements for the plurality of items according to the received ranking of the plurality of items.

12. A method comprising:
receiving item data identifying a plurality of items for a search query provided by a user;
determining, for each of the plurality of items, a first value based on a relevance of each of the plurality of items to the search query;
determining user engagement data for the user, wherein the user engagement data identifies engagements by the user for each of the plurality of items on a webpage, wherein the user engagement data identifies at least a first engagement type, a second engagement type, and a third engagement type;
determining, for each of the plurality of items, a weight value based on the user engagement data for each of the plurality of items, wherein:
- the weight value is a first weight value when the first engagement type is above a first threshold;
- the weight value is a second weight value when the first engagement type is not above the first threshold and the second engagement type is above a second threshold;
- the weight value is a third weight value when the second engagement type is not above the second threshold and the third engagement type is above a third threshold; and
- the weight value is a fourth weight value when the third engagement type is not above the third threshold;
determining, for each of the plurality of items, a second value based on the user engagement data and the weight values;
determining, based on the first values and the second values, a ranking of the plurality of items; and
transmitting the ranking of the plurality of items.

13. The method of claim 12 wherein the item data identifies an initial ranking of the plurality of (items, and wherein the method further comprises:

determining, for each of the plurality of items, a third value based on the initial ranking of the plurality of items and the user engagement data corresponding to each of the plurality of items, wherein determining the second value for each of the plurality of items is based on the third value.

14. The method of claim 13 wherein the third value for each of the plurality of items is determined based on the corresponding weight value.

15. The method of claim 14, wherein the first engagement type comprises a number of clicks, the second engagement type comprises a number of add-to-cart events, and the third engagement type comprises a number of orders, wherein determining the weight value comprises:
  determining the weight value is the first weight value when the number of clicks is above a first threshold;
  determining the weight value is the second weigh value when the number of clicks is not above the first threshold and the number of add-to-cart events is above a second threshold;
  determining the weight value is the third weight value when the number of add-to-cart events is not above the second threshold and the number of orders is above a third threshold; and
  determining the weight value is the fourth weight value when the number of orders is not above the third threshold.

16. The method of claim 12 further comprising:
  receiving the search query from a web server;
  requesting the item data identifying the plurality of items from an item recommendation system; and
  receiving the item data from the item recommendation system.

17. A non-transitory computer readable medium having instructions stored thereon, wherein the instructions, when executed by at least one processor, cause a device to perform operations comprising:
  receiving item data identifying a plurality of items for a search query provided by a user;
  determining, for each of the plurality of items, a first value based on a relevance of each of the plurality of items to the search query;
  determining user engagement data for the user, wherein the user engagement data identifies engagements by the user for each of the plurality of items on a webpage, wherein the user engagement data identifies at least a first engagement type, a second engagement type, and a third engagement type;
  determining, for each of the plurality of items, a weight value based on the user engagement data for each of the plurality of items, wherein:
    the weight value is a first weight value when the first engagement type is above a first threshold;
    the weight value is a second weight value when the first engagement type is not above the first threshold and the second engagement type is above a second threshold;
    the weight value is a third weight value when the second engagement type is not above the second threshold and the third engagement type is above a third threshold; and
    the weight value is a fourth weight value when the third engagement type is not above the third threshold;
  determining, for each of the plurality of items, a second value based on the user engagement data and the weight values;
  determining, based on the first values and the second values, a ranking of the plurality of items; and
  transmitting the ranking of the plurality of items.

18. The non-transitory computer readable medium of claim 17, wherein the item data identifies an initial ranking of the plurality of items, further comprising instructions stored thereon that, when executed by the at least one processor, further cause the device to perform operations comprising:
  determining, for each of the plurality of items, a third value based on the initial ranking of the plurality of items and the user engagement data corresponding to each of the plurality of items, wherein determining the second value for each of the plurality of items is based on the third value.

19. The non-transitory computer readable medium of claim 18 further comprising instructions stored thereon that, when executed by the at least one processor, further cause the device to perform operations comprising determining the third value for each of the plurality of items based on the corresponding weight value.

20. The non-transitory computer readable medium of claim 19, wherein the first engagement type comprises a number of clicks, the second engagement type comprises a number of add-to-cart events, and the third engagement type comprises a number of orders, the non-transitory computer readable medium further comprising instructions stored thereon that, when executed by the at least one processor, further cause the device to perform operations comprising:
  determining the weight value is the first weight value when the number of clicks is above a first threshold;
  determining the weight value is the second weigh value when the number of clicks is not above the first threshold and the number of add-to-cart events is above a second threshold;
  determining the weight value is the third weight value when the number of add-to-cart events is not above the second threshold and the number of orders is above a third threshold; and
  determining the weight value is the fourth weight value when the number of orders is not above the third threshold.

* * * * *